Figure 1:
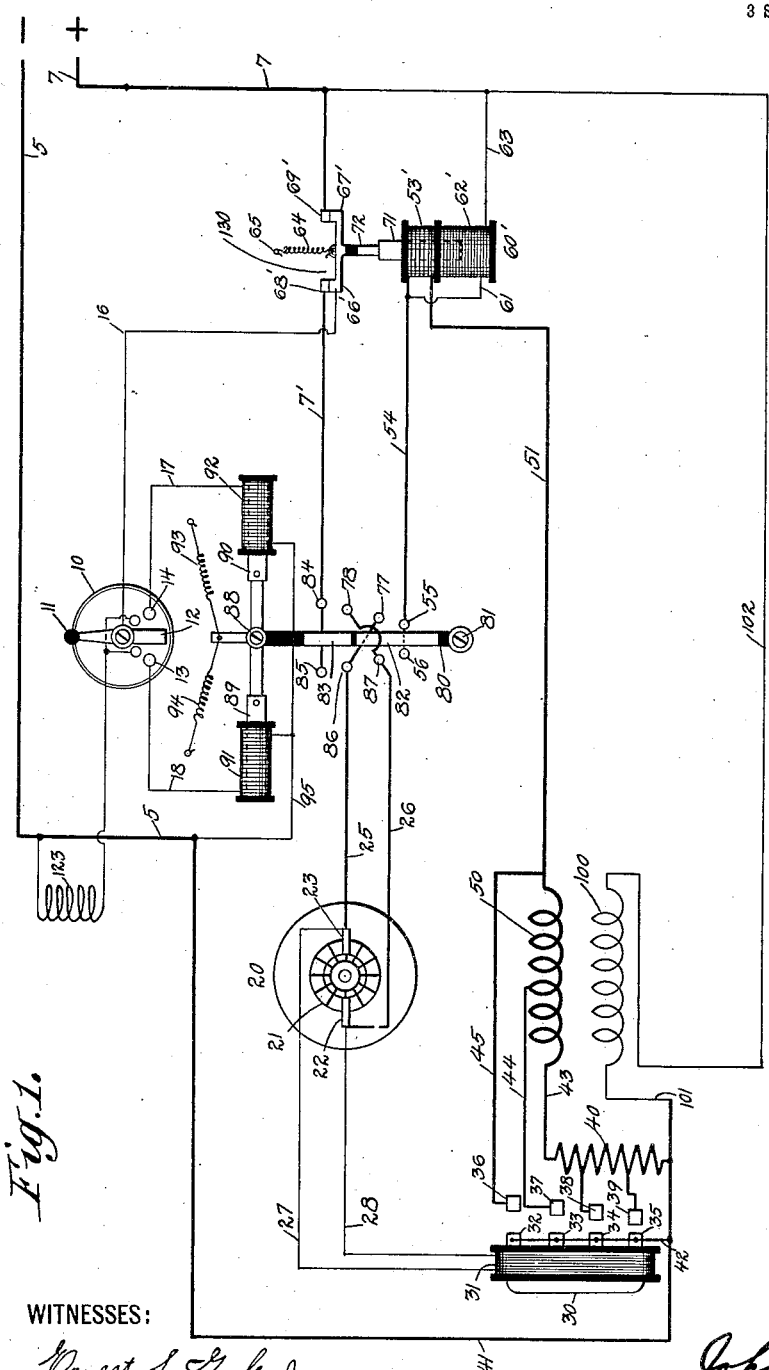

J. D. IHLDER.
CONTROLLING APPARATUS FOR ELECTRIC MOTORS.
APPLICATION FILED DEC. 6, 1907.

1,028,731.

Patented June 4, 1912.

3 SHEETS—SHEET 1.

WITNESSES:

INVENTOR

ATTORNEY

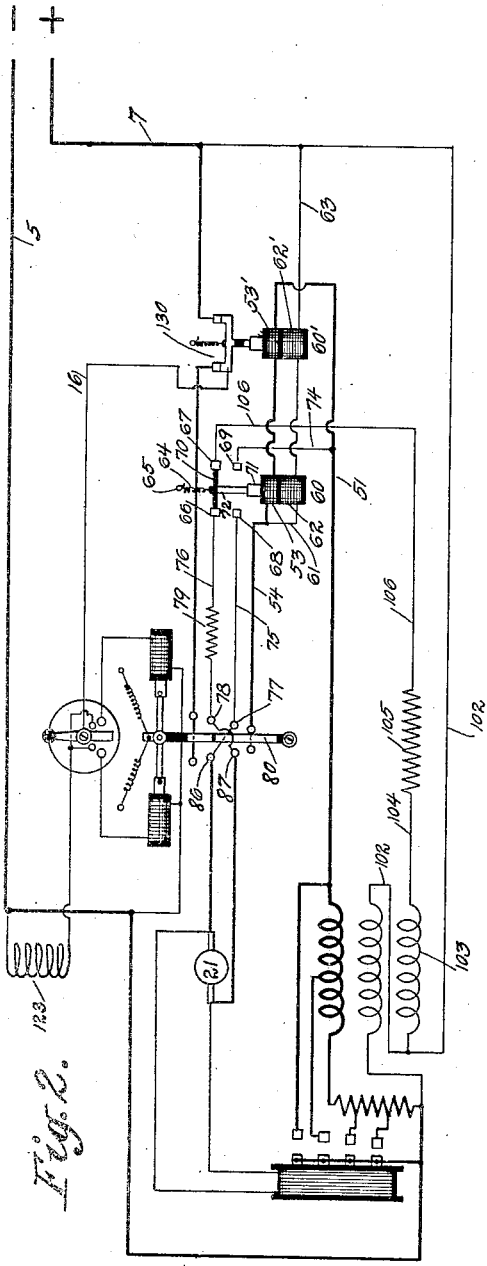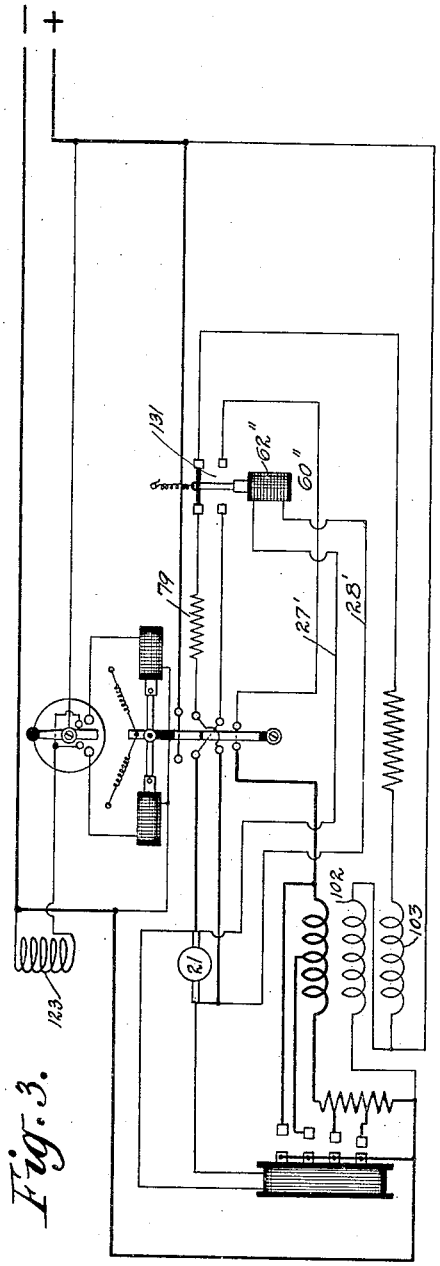

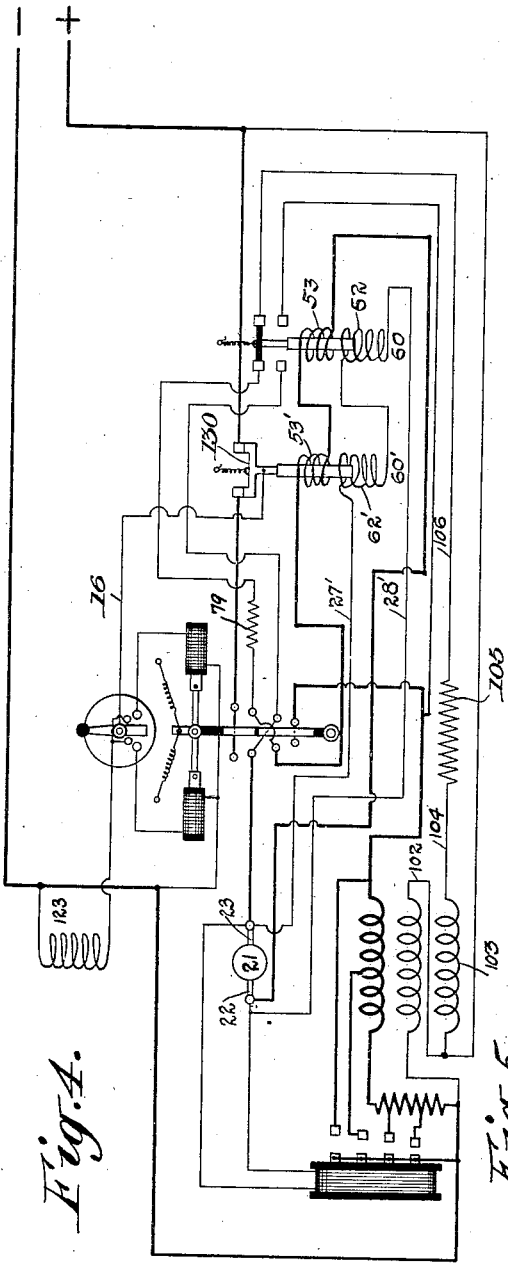
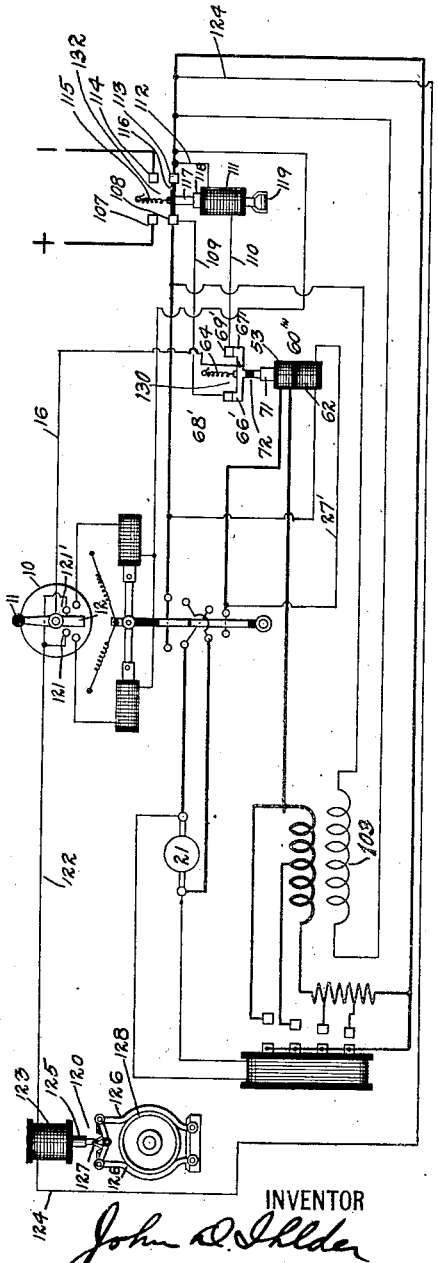

UNITED STATES PATENT OFFICE.

JOHN D. IHLDER, OF NEW YORK, N. Y., ASSIGNOR TO OTIS ELEVATOR COMPANY, OF JERSEY CITY, NEW JERSEY, A CORPORATION OF NEW JERSEY.

CONTROLLING APPARATUS FOR ELECTRIC MOTORS.

1,028,731.  Specification of Letters Patent.  Patented June 4, 1912.

Application filed December 6, 1907. Serial No. 405,349.

*To all whom it may concern:*

Be it known that I, JOHN D. IHLDER, a citizen of the United States, residing in New York city, in the county of New York and State of New York, have invented a new and useful Improvement in Controlling Apparatus for Electric Motors, of which the following is a specification.

My invention relates to controlling devices for electric motors, and is an improvement on the apparatus disclosed in my Patent No. 851,239, granted April 23, 1907, for an improvement in controlling devices for electric motors.

The object of my invention is to simplify and render more efficient the operation of electric motors.

Other objects of the invention will appear hereinafter, the novel combinations of elements being set forth in the appended claims.

In the accompanying drawings, Figure 1 is a diagrammatic view showing the application of my invention to the control of an electric motor, and comprises an electric switch operated by a single doubly wound magnet to control the motor circuit directly, and a brake magnet coöperating with said switch; Fig. 2 represents diagrammatically a similar view, but comprises two doubly wound magnets, one for controlling the motor circuit directly, and the other for controlling an extra field and an electro-dynamic brake circuit; Fig. 3 includes a magnet having a single winding connected directly across the armature, said magnet operating a switch to control the electro-dynamic brake circuit and the extra field circuit; Fig. 4 is a view similar to Fig. 2, in that a brake magnet and two doubly wound controlling magnets are shown, but variations in connections of the respective windings of the controlling electro-magnets are illustrated; and Fig. 5 represents a brake apparatus in combination with an electro-magnetic main line switch, which in turn is controlled by an auxiliary magnetic switch comprising a doubly wound electro-magnet.

Similar parts in all the views are designated by similar reference signs.

In the operation of electric motors which are required to operate under frequently varying conditions of load, as, for instance, in the special field of electric elevators, the motor sometimes attains an undue or excessive speed. This is particularly true in the case of motors employed in electric elevator service when the motor is driven by the load, and thereby becomes a generator. It is among the special purposes of my invention to provide means which are simple, efficient and automatic in operation for imposing a retarding and a stopping influence upon the motor. This object may be accomplished in many different ways, as by applying an electro-dynamic brake to the motor, by strengthening the magnetic field of the motor, or by breaking the motor circuit and applying a mechanical brake, or by combining these several methods, and in carrying out my invention I purpose to provide means operated automatically when the motor attains an undue or excessive speed for accomplishing the objects and purposes stated.

It is obvious that my invention may be applied to many different styles and types of motors and accessory devices for starting, stopping, reversing and controlling the motor. While, therefore, I have selected for the purpose of illustration a certain type or motor and controlling devices therefor, I desire it to be understood that my invention is not to be limited or restricted thereto, as variations therefrom and changes therein would readily suggest themselves to persons skilled in the art without departure from the spirit and scope of my invention, and without affecting the objects and purposes attained by my invention or the coöperative operation thereof.

In the several views of the accompanying drawings, 20 designates a motor, 21 the armature thereof, 22, 23 its brushes, 50 a series field winding, 40 a sectional starting resistance in circuit with the series field winding, and 100 designates the shunt field winding.

Any suitable construction and arrangement may be employed for successively cutting out or short-circuiting step by step the sectional resistance 40 and the series field coils 50 as the motor accelerates in speed. I have selected for purposes of illustration one form of mechanism for accomplishing this result, to which, however, my invention is not to be limited or restricted. This mechanism comprises the magnet 30, the winding or coil 31 of which is included in a circuit completed by the leads 27 and 28 connected across the motor armature. It will be readily seen that by this arrangement as the motor accelerates, the strength of the magnet 30 increases to effect a successive cutting out or short-circuiting of the starting resistance 40 and the series field coil 50, as, for instance, by successively attracting the contacts 39, 38, 37 and 36 to the contacts 35, 34, 33, 32, respectively, in a well understood manner.

Any suitable form of construction and arrangement of starting, stopping and reversing switches may be employed for controlling the motor. While, therefore, I have selected for purposes of illustration a simple construction of switches, which in practice is well adapted for the purpose, I desire it to be understood that my invention is in no wise to be limited or restricted to the form shown.

A simple starting and stopping switch is shown at 10 and comprises a movable member or switch lever 12 provided with an operating handle 11 and arranged to be brought into contact with either one or the other of the coöperating contacts 13, 14. The contact-maker 12 is connected to the positive main 7 through the conductor 16 and the switch comprising the contacts 68' and 69'.

The solenoids 91 and 92 are respectively included in circuit with the switch 10 through the conductor 95 on one side and the conductors 18 and 17 on the other, the conductor 95 being connected to the negative main 5. The solenoids 91, 92 by acting on their cores or plungers 89 and 90, respectively, control a reversing switch which, as above indicated, may be of any form or construction. In the form selected for purposes of illustration, this switch comprises a lever 80 pivoted as at 81, to which are connected as at 88 the plungers 89 and 90 so that said lever may be rocked or swung in one direction or the other, according as one or the other of the solenoids 91, 92 receives current. The lever 80 includes suitably insulated conducting parts 82, 83. The part 82 operates to bridge the fixed contacts 87, 56 when the lever 80 is rocked in one direction, and to bridge contacts 77, 55 when said lever is rocked in the other direction. Similarly, part 83 serves to bridge contacts 85, 86 or 84, 78, according to the direction in which lever 80 is rocked. Contacts 85, 84 are connected together electrically and also to the positive main 7 through the conductor 7', contacts 68', 66', 67', 69'. The contacts 77 and 86 are electrically connected together and through conductor 25 to the motor brush 23; while contacts 78 and 87 are electrically connected together and through conductor 26 to the motor brush 22. The contacts 56, 55 are electrically connected together and through conductors 54 and 51 are in series with the field 50, resistance 40, and conductor 41 leading to the negative main 5. The shunt field winding 100 is connected on one side through conductor 102 with the positive main 7, and on the other side through conductors 101 and 41 to the negative main 5. If desired, the reversing switch lever 80 may be held in central position in any convenient manner, as, for instance, by means of the springs 93, 94.

The parts so far described and referred to and as above indicated may be of any suitable construction and arrangement, the specific construction and arrangement of the details thereof *per se* are not of my invention, being selected merely for the purposes of illustration, and as showing constructions and arrangements which are practicable and efficient in operation and coöperation with my invention. In carrying out my invention and in associating the same with the motor and accessory devices of the general nature above referred to and as indicated, I purpose to provide means whereby the motor may be automatically slowed down and positively stopped upon attaining an undue or excessive speed, and it is obvious that this result may be accomplished in many specifically different ways. In one form of retarding apparatus an electrodynamic brake is included, this brake being in shunt circuit across the armature. This shunt circuit is completed automatically upon undue or excessive speed developed by the motor or by the current generated by the motor when it is run as a generator. I have shown a resistance 79 in Figs. 2, 3 and 4 connected on one side to the contact 78 and on the other side through conductor 76 to a contact 66. The coöperating contact 68 is connected through wire 75 to contact 77. This shunt circuit is normally open between the contacts 66 and 68. Any suitable means may be used, such, for instance, as the magnet 60 (Fig. 2) arranged to be properly and suitably energized when the motor attains an undue or excessive speed, or becomes a generator, to close the circuit between the contacts 66 and 68. The resistance 79 when its circuit is closed thus forms in effect an electro-dynamic brake, and its tendency is to slow down the motor.

In Figs. 3 and 4, magnets 60" and 60, respectively, control the circuits for the resistance 79.

The brake magnet 123 is controlled by a switch operated by the magnet 60' (Figs. 1 and 2 and 4) to open the circuit of the brake magnet coil and effect the application of the mechanical brake to stop the motor when the same operates at an excessive speed. If desired, the brake 123 may be controlled only by the manual switch 10 as shown in Fig. 3.

In Figs. 2, 3 and 4 is shown an extra shunt field winding 103 which is connected in circuit to automatically strengthen the magnetic field of the motor when the electro-dynamic brake circuit is closed. If desired, there may be included in the extra shunt field circuit a resistance 105. The contact 67 is normally separated from a coöperating contact 69 which is connected through conductor 74 to conductor 51, and hence when this circuit is closed through contacts 67, 69 the auxiliary shunt field circuit is established. The contacts 67, 69 may be brought into engagement with each other by the magnet 60 when an undue or excessive speed of the motor is attained.

If desired, the methods above described of applying an electro-dynamic brake and of strengthening the magnetic field of the motor may be combined in their action, or may be carried out at the same time, as, for instance, by connecting both contacts 66 and 67 through insulation 70, and a rod 72 with the plunger 71 of magnet 60, any suitable arrangement being employed to maintain the contacts 66, 67 normally separated from their respective coöperating contacts 68, 69. For instance, this result may be accomplished by a spring 64 secured at one end to a fixed point 65 and connected at its other end to the rod 72, the tension of said spring operating to normally maintain the contacts 66 and 67 out of engagement with the contacts 68 and 69 until the magnet 60 becomes sufficiently energized to overcome such tension.

In Fig. 1 the switch controlled by the magnet 60′ is in the main conductor or motor circuit. In this case the energization of the magnet 60′ in a manner hereinafter described will break the motor circuit by separating the contacts 66′ and 67′, respectively, from the contacts 68′ and 69′. It will also be observed that when the switch 10 is closed and the motor circuit is closed, the brake magnet 123 will receive current across the mains. Upon the opening of the switch controlled by the magnet 60′, however, not only the motor circuit will become interrupted, but also the circuit of the brake magnet 123, for the reason that the conductor 16 is connected to the contact 66′ or 67′. Therefore, when the circuit-breaker is in open position, one terminal of the brake magnet is entirely isolated and the latter therefore cannot possibly receive any current even from the motor acting as a generator.

In Fig. 2 when the motor speed becomes excessive, not only is the electro-dynamic brake applied and the field of the motor strengthened, but the motor circuit is also interrupted. This may be done in successive order. When the motor circuit is interrupted the circuit of the brake magnet 123 is also interrupted, and one of its terminals isolated. The result, therefore, is that if the magnets 60 and 60′ operate successively, the motor will first be slowed down and then be brought to a positive stop automatically by the cutting off of the current from the motor and from the brake magnet.

In Fig. 3 the magnet 60″ operates a switch to effect a strong electro-dynamic braking effect to slow down the motor, which may also bring the motor to a stop, particularly if the load is not too great or is nearly balanced. To positively stop the motor, however, and to hold the same in stationary position, the opening of the manual switch 10 is relied upon to cut off the current from the brake magnet 123.

In Fig. 1 the magnet 60′ is provided with oppositely wound coils 62′ and 53′. In Fig. 2 the magnet 60 is also provided with oppositely wound coils 62 and 53. The magnets 60 and 60′ may therefore each be termed a doubly wound magnet or a differential magnet. In Fig. 1 the winding 53′ is arranged to be included in series with the motor armature, while the winding 62′ is connected through the conductors 61 and 63 in a shunt circuit around the motor armature, provided the reversing switch is closed and the switch controlled by the magnet 60′ is closed. Under these conditions it will be observed that the energizing effect of the windings of the magnets tends to neutralize each other. The energizing effect of the coil 62′ will vary with the variation of potential across the motor armature, since said coil is connected directly to the armature brushes when the motor circuit is closed through the reversing switch and the switch controlled by the magnet 60′, and the energizing effect of the coil 53′ will vary with the current through the armature, and consequently when the potential across the brushes sufficiently increases, due to excessive speed, the overbalancing or neutralizing effect of the coil 53′ is overcome and the magnet 60′ will become sufficiently energized to accomplish the objects and purposes set forth. In other words, the coils 53′ and 62′ tend to neutralize each other, and the magnet comprising said coils becomes sufficiently strong to operate its switch to open the motor circuit only when the difference in the strengths of these coils becomes sufficiently great. Ordinarily at the same time that the coils 62′ strengthens, the coil 53′ weakens, thus increasing the differential action of the entire magnet. In case the motor becomes a generator so that it sends current back into the line, the flow of current through the coil 53′ will coincide in direction with that through coil 62′, and the same results will be secured.

The operation of the arrangement shown in Fig. 1 may be explained as follows: Let it be assumed that the switch lever 12 is moved into engagement with the contact 13 so that a circuit will be established from the positive main 7, through conductor 16, lever 12, contact 13, conductor 18, solenoid 91, wire 95 to the negative main 5. The resulting energization of the left-hand magnet as viewed in Fig. 1 results in rocking the lever 80 to the left, thereupon completing the motor circuit as follows: from the positive main 7 to and through the contacts 69', 67', 66', 68', conductor 7', contact 85, contact strip 83, contact 86, conductor 25, brush 23, armature 21, brush 22, conductor 26, contact 87, contact strip 82, contact 56, conductor 54, coil 53', conductor 51, series field coils 50, resistance 40, conductor 41 to the negative main 5. The shunt field circuit is completed from the positive main 7 through conductor 102, shunt field winding 100, conductor 101, and conductor 41 to the negative main 5. The motor can now start, the subsequent operations being automatic. As the motor accelerates, the sectional resistance 40 and the series field coils 50 are gradually cut out, circuits being successively completed through the conductors 43, 44, 45 and 42. Should the motor attain an undue or excessive speed and thereby develop an increase of potential, the magnet 60' becomes sufficiently energized to open the switch 130, thereby cutting off the current from the motor which will thereupon be slowed down and stopped, particularly when the brake is applied mechanically to the brake pulley on the motor shaft, due to the deënergization of the brake magnet 123. This is provided for in Fig. 1 by connecting the conductor 16 to the cross-piece of the switch 130 so that when the latter is opened one terminal of the brake magnet is isolated, therefore by no possibility can the latter receive current even from the motor acting as a generator.

In Fig. 2, assuming that the motor has been started by moving the switch lever 80 to the left, when the motor attains an undue or excessive speed or becomes a generator, both the magnets 60 and 60' will be operated to effect a stopping of the motor, or they may be so wound that they will act successively. When the magnet 60 pulls the insulating cross-piece 70 downwardly against the action of the spring 64, the contact 66 will engage the contact 68 and the contact 67 will engage the contact 69. A shunt circuit is then completed around the armature through the resistance 79. An extra field circuit is also closed including the windings 103 and the resistance 105. Upon the proper energization of the magnet 60' the main line or motor armature circuit is broken to cut off current from the motor. Upon the opening of the switch 130, current is cut off also from the brake magnet 123. If the magnets 60 and 60' operate successively, the electro-dynamic brake circuit, assisted by the increased strength of field, may retard the motor to such an extent as to stop the same, or nearly so. Then upon the operation of the switch 130 the mechanical brake is applied to positively stop the motor and hold the same from rotating.

I have traced the circuits when the contact lever 12 is moved onto the contact 13 so as to effect the energization of the solenoid 91. When said contact lever 12 is moved in the opposite direction onto the contact 14, the solenoid 92 receives current to rock the lever 83 toward the right to cause a reversal of current through the motor armature, and thus reverse the direction of rotation of the motor.

In Fig. 2 the coils 53 and 53' are connected in series with each other in the armature circuit between the conductors 54 and 51 when the reversing switch is closed in either direction. At this time also the coils 62 and 62' are connected in series with each other in a circuit including the conductors 61 and 63, which circuit is in shunt to the motor armature.

In Fig. 3 only one coil 62'' is relied upon to operate a switch to close the electro-dynamic brake circuit, and, if desired, also the extra field circuit. It is evident that this magnet may operate a switch similar to that designated 130 in Fig. 2 to cut off the current from the motor. In Fig. 3 the coil 62'' is connected directly across the motor armature by means of the conductors 27' and 28', so that when the speed of the motor becomes excessive and the counter-electro-motive force reaches a predetermined value, sufficient current is shunted through the coil 62'' to close the multiple switch 131.

In Figs. 1, 2 and 5 the coils 62 and 62' are connected across the armature outside of the reversing switch, so that the direction of flow of the current in these coils is always the same, regardless of reversals of current through the motor armature. The same is true with regard to the series coils 53 and 53', so that the direction of current through the different coils will always maintain the proper relation. In Fig. 4 the connections are different. Here the terminals of the coils 62, 62' are connected by the conductors 27', 28' directly to the armature brushes between the armature and the reversing switch, so that the direction of current through the coils 62, 62' is reversed whenever the current through the motor is reversed. Also the series coils 53, 53' are connected in the armature circuit between the brush 22 and the reversing switch so that the direction of current through these coils will likewise be reversed when the current through the motor is reversed. Except as just noted the arrangement in Fig. 4 is substantially the same as in Fig. 2. Thus the directions of current in the various coils will maintain the proper relation, whether the connections are as illustrated in Fig. 4 or as in Figs. 1, 2 and 5. The arrangement in Fig. 4 permits the magnets 60 and 60' to operate independently of the reversing switch and thus maintain the electro-dynamic brake circuit closed and the extra field circuit closed, even though the reversing switch is open. This is also true with respect to Fig. 3 where the single coil 62'' connected directly across the armature closes the electro-dynamic brake circuit and the extra field circuit independently of the position of the reversing switch. It should be noted that the shunt field circuit is connected directly across the mains, and therefore permanently energized so long as potential remains on the line, or the positive and negative leads are connected to a suitable source of electric power. For instance, in Fig. 3 current will flow through the shunt field winding 102 whether the reversing switch is closed or open, and if the switch 131 is closed the extra field winding 103 will also receive current. Therefore when the motor is driven by momentum and the switch 131 is closed, an electro-dynamic braking effect is caused by the generation of current through the resistance 79. It should be observed, however, that such retarding effect would be of only short duration when the reversing switch is open, for the reason that the manual switch being opened cuts off the current from the brake magnet to cause the mechanical brake to be applied.

In Fig. 5 I have shown a doubly wound or differentially acting magnet 60''' comprising a series coil 53 and a shunt coil 62. These coils are wound so as to oppose each other, and at normal speed of the motor the differential action between the two coils on the plunger 71 is not sufficient to open the switch 130, but when the speed of the motor becomes excessive or reaches a predetermined value, or the motor acts as a generator, the coil 62 will overcome the action of the coil 53 and the core 71 will be drawn downwardly to open the switch 130 and thus break the circuit through the conductors 109, 110, solenoid 111 and conductor 112. In this instance a main line switch 132 is interposed between the positive and negative mains and the switch 130. This main line switch is controlled by the potential magnet comprising the solenoid 111 and plunger 118. The latter is connected by the rod 117 to the insulating cross-piece 116, which in turn carries the contacts 108 and 113. Normally the compression spring 115 presses down on the insulating bar 116, but the latter may be moved upwardly manually by means of the handle 119 so that the contact 108 will engage the contact 107 and the contact 113 will engage the contact 114.

The potential magnet will thus be placed across the mains, and so long as it receives sufficient current, will hold the main line switch closed. When, however, the switch 130 is opened it is obvious that the current through the solenoid 111 will be cut off and the switch 132 will therefore be opened to cut off the current entirely from the motor and effect the application of the mechanical brake illustrated at the upper left-hand portion of Fig. 5. The mechanical brake may be of any type desired. In this instance I have shown a brake pulley 128, and associated with the same the brake levers 126, 126. These brake levers are normally held together against the pulley 128 by means of the spring 127, and when the solenoid 123 receives current the core 125 will be lifted against the action of the spring 127 to release the brake shoes.

The operation of the apparatus illustrated in Fig. 5 is as follows: When the handle 11 of the switch 10, which may be in an elevator car for instance, is moved to the right or left, the motor circuit is closed and the motor is accelerated to full speed, provided the brake apparatus 120 is first operated. This is accomplished by the contacts 121, 121' in the switch 10 which are engaged by the lever 12 to close a circuit which may be traced from the positive main through the contacts 107, 107, wire 109, contacts 68', 66', wires 16, 122, magnet 123, wire 124, and contacts 113 and 114 to the negative main. Now, when the motor speed exceeds a predetermined value or becomes a generator, the switch 130 will be opened, and therefore current immediately cut off from the brake magnet 123. This will cause the brake apparatus 120 to be applied to positively stop the motor. When the switch 130 is opened, the potential switch will also be opened to cut off the current entirely from all the motor circuits. In such case the main line switch 132 must be closed manually before the motor can again be started.

Having now set forth the objects and nature of my invention, and various constructions and arrangements for accomplishing such objects, and without limiting myself to any of the details, what I claim as new and useful and of my own invention, and desire to have protected by Letters Patent of the United States, is:—

1. The combination with a motor, of controlling apparatus therefor, a differential relay, and means controlled by said relay for effecting a positive stop of said motor when the same acts as a generator or attains an undue speed.

2. The combination with a motor, of a main line switch therefor, a brake magnet, a doubly wound magnet, and means whereby said doubly wound magnet effects the opening of the main line switch and the deenergization of said brake magnet when the motor acts as a generator or runs at an excessive speed.

3. The combination with an electric motor, of a main line switch and controlling apparatus for said motor, a brake magnet, a differentially wound magnet associated with said switch and having one winding connected in series with the motor armature, and having the other winding connected across the motor armature, means for maintaining said switch in closed position during normal operation of the motor, and means controlled by said differential magnet for effecting the opening of the main line switch and the deënergization of the brake magnet when the motor attains an excessive speed.

4. The combination with an electric motor, of a doubly wound magnet having one winding connected directly across the motor armature, and the other winding arranged to be connected in series with the motor armature, and electro-mechanical means controlled by said electro-magnet for effecting the stopping of the motor when the speed of the latter becomes excessive or when said motor acts as a generator.

5. The combination with an electric motor, of controlling apparatus therefor, a doubly wound magnet, and electrical devices controlled by said magnet for effecting a positive stop of the motor when the speed of the latter becomes excessive or when said motor acts as a generator.

6. The combination with an electric motor, of controlling apparatus therefor, a differentially wound magnet having one winding dependent upon armature potential and the other upon armature current and normally receiving opposing currents, and means mechanically disconnected from but controlled by said magnet for effecting a positive stop of the motor.

7. The combination with a motor, of controlling apparatus therefor, an electric switch for closing the circuit to the motor, and a differential magnet having its windings connected to the motor and controlled thereby and arranged to control said switch to effect the interruption of current to the motor when the speed of the latter becomes excessive or when said motor acts as a generator.

8. The combination with a motor, of a reversing switch, a brake magnet, a switch in the brake magnet circuit, and a differential electromagnet having windings connected to normally receive opposing currents for operating said last named switch when the potential across the armature exceeds a predetermined value.

9. The combination with a motor, of a reversing switch, a brake magnet, a switch controlling the brake magnet circuit, and an electromagnet comprising windings in parallel and in series respectively with the motor armature for operating said last named switch when the potential across the armature exceeds a predetermined value.

10. The combination with a motor, of brake apparatus therefor comprising a brake magnet, a switch for controlling the brake magnet circuit, and a differential magnet for operating said switch upon the speed of the motor exceeding a predetermined value.

11. The combination with a motor, of a differentially wound magnet having its windings connected in series and parallel, respectively, with the motor armature and receiving opposing currents during the normal operation of the motor, a switch operated by said magnet, and a brake magnet controlled by said switch.

12. The combination with an electric motor, of a doubly wound magnet having one winding connected permanently across the motor armature, and the other winding in series with the motor armature, and means controlled by said magnet for effecting the retardation or stopping of the motor.

13. The combination with an electric motor, of a reversing switch for the motor, a differential relay having its windings both connected between the motor armature and reversing switch in parallel and in series, respectively, with the motor armature, and means operated by said relay for controlling the speed of the motor.

14. The combination with a motor, of a supply circuit therefor, a brake magnet, a switch in said supply and brake magnet circuits, an additional switch arranged to control the field strength of the motor and a resistance in a circuit around the armature brushes, and differential magnets associated with both of said switches and arranged and connected so that the operation of said switches will effect a slow down and stopping of the motor when the speed of the latter exceeds a predetermined limit.

15. The combination with a motor, of means dependent upon the speed of the motor for effecting a retardation of the same, additional means for stopping the motor whenever the speed of the latter exceeds a predetermined limit, and differential magnet windings associated with both of said means, substantially as described.

16. The combination with a motor, of a brake and circuit therefor, a normally open circuit in shunt to the motor armature, electrically operated switches for controlling said brake and shunt circuits, and means for effecting the operation of said switches one before the other, said means made operative upon undue or excessive speed of the motor and comprising differential magnet windings.

17. The combination with an electric motor, of means entirely electrical for reducing the speed of the motor, means for positively stopping the motor, and differential magnet windings associated with and arranged to operate said speed reducing and stopping means upon undue speeds of the motor.

18. The combination with an electric motor, of a main line switch, a brake, a circuit for said brake controlled by said switch, mechanical means for holding said main line switch in closed position, a differentially wound magnet having one winding connected across the motor armature and the other in series therewith, and means operated by said magnet for opening said main line switch.

19. The combination with an electric motor, of a main line switch, a brake, a circuit for said brake controlled by said switch, means for operating the switch, a doubly wound magnet having one winding connected across the motor armature and the other winding in series with the motor armature, and means operated by said magnet when the motor speed exceeds a predetermined value for effecting the opening of the main line switch.

20. The combination with an electric motor, of an electro-dynamic brake circuit for the motor, a field circuit for the motor, a switch in said circuits, means for holding said switch open during the normal operation of the motor, an electromagnet for closing the said switch, and a circuit for the magnet winding permanently connected in parallel with the motor armature.

21. The combination of an electric motor, a reversing switch for the motor, an electro-dynamic brake circuit in parallel with the motor armature, resistance in said circuit, a circuit comprising an extra field winding for the motor, and an electromagnetic switch controlling said circuits and comprising a magnet winding in a circuit in parallel with the motor armature, said winding having its terminals connected between the armature and the reversing switch.

In testimony whereof, I have signed my name to this specification in the presence of two subscribing witnesses.

JOHN D. IHLDER.

Witnesses:
CHAS. M. NISSEN,
JAMES G. BETHELL.